(12) United States Patent
Kaulbersch et al.

(10) Patent No.: US 7,497,463 B2
(45) Date of Patent: Mar. 3, 2009

(54) LINING FOR THE COVER OF AN AIRBAG

(75) Inventors: Nicole Kaulbersch, Leinfelden (DE); Ludwig Fleiner, Pfullingen (DE)

(73) Assignee: Eissmann Automotive Deutschland GmbH, Bad Urach (DE)

( * ) Notice: Subject to any disclaimer, the term of this patent is extended or adjusted under 35 U.S.C. 154(b) by 445 days.

(21) Appl. No.: 11/195,242

(22) Filed: Aug. 2, 2005

(65) Prior Publication Data

US 2007/0182133 A1     Aug. 9, 2007

(30) Foreign Application Priority Data

Aug. 5, 2004 (DE) ........................ 10 2004 038 314
Apr. 20, 2005 (EP) .................................. 05008603

(51) Int. Cl.
*B60R 21/215* (2006.01)

(52) U.S. Cl. ................................... 280/728.3; 280/732

(58) Field of Classification Search ............. 280/728.2, 280/732, 752; 428/43; 83/881, 883
See application file for complete search history.

(56) References Cited

U.S. PATENT DOCUMENTS

| 5,611,564 | A | * | 3/1997 | Bauer ....................... 280/728.3 |
| 5,968,381 | A | | 10/1999 | Nusshor |
| 6,099,026 | A | | 8/2000 | Ando et al. |
| 6,224,090 | B1 | * | 5/2001 | Lutze et al. ............... 280/728.3 |
| 6,294,124 | B1 | | 9/2001 | Bauer et al. |
| 6,337,461 | B1 | * | 1/2002 | Yasuda et al. .......... 219/121.62 |
| 6,533,314 | B2 | * | 3/2003 | Merrifield et al. ........ 280/728.3 |
| 6,612,608 | B2 | * | 9/2003 | Schmidt et al. .......... 280/728.3 |
| 6,692,019 | B2 | * | 2/2004 | Sommer ..................... 280/732 |
| 7,000,942 | B2 | * | 2/2006 | Lutze et al. ............... 280/728.3 |
| 7,014,209 | B2 | * | 3/2006 | Muller et al. ............. 280/728.3 |
| 2002/0043144 | A1 | | 4/2002 | Reh et al. |
| 2004/0164531 | A1 | * | 8/2004 | Riha et al. .................. 280/732 |
| 2004/0262892 | A1 | | 12/2004 | Soejima |
| 2005/0104337 | A1 | * | 5/2005 | Merrifield et al. ........ 280/728.3 |

FOREIGN PATENT DOCUMENTS

| DE | 10055546 | 9/2001 |
| DE | 10126911 | 1/2003 |
| DE | 10129618 | 1/2003 |
| EP | 0 121 193 | 10/1984 |
| EP | 0711627 | 5/1996 |
| EP | 1493548 | 1/2005 |
| WO | 9703866 | 2/1997 |

* cited by examiner

*Primary Examiner*—Ruth Ilan
*Assistant Examiner*—Drew J. Brown
(74) *Attorney, Agent, or Firm*—Michael J. Striker

(57) ABSTRACT

In order to realize the required weakening geometries in a lining material for the hinged cover of an airbag, punctures are produced on the inner side of a lining material by a puncturing needle, wherein the punctures are intermittently produced in the lining material from the inner side, the weakening geometry deviates from a straight line to ensure constant, reliable and defined tearing characteristics of the lining material, wherein for producing the lines of arbitrary weakening geometries by the punctures, the puncturing needle is oriented relative to the desired line direction in one preferred embodiment of the invention, i.e., the cutting edge of the puncturing needle is aligned with the weakening geometry to be produced.

25 Claims, 2 Drawing Sheets

LINING FOR THE COVER OF AN AIRBAG

BACKGROUND OF THE INVENTION

The present invention relates to a lining for the cover of an airbag.

Nowadays, airbags are integrated into motorvehicles at various locations, e.g., in steering wheels, dashboards, doors, seats, interior roof linings, etc. The best solution for ensuring the proper function of the airbag consists of providing the lining for the cover of the airbag with a so-called airbag documentation seam in the region of the hinged airbag cover. This ensures that the hinged airbag cover can open in an unobstructed fashion and that the airbag can unfold in case of a crash.

For reasons of optical appearance and interior design, motor vehicle manufacturers increasingly demand, for example, that the passenger airbag integrated into the dashboard is covered on the outer side such that it is no longer visible. This is achieved by providing the dashboard with the hinged airbag cover integrated therein with a lining. However, this lining needs to be provided with a weakening in the peripheral region of the hinged airbag cover in order to ensure that the hinged airbag cover can open and the airbag can unfold in case of a crash. Various methods have been proposed for realizing this weakening of the lining. For example, linings consisting of leather or imitation leather can be scribed on the rear side in order to weaken the material. In other known methods, the lining material is dissolved, eroded or evaporated with chemical means or a laser beam. EP 1 21 193 A1 proposes to perforate the lining. In order to conceal the perforations on the visible side, the openings are filled in again after they are produced.

If the lining material is weakened by means of scribing, it is disadvantageous that the notch gapes if a deep incision is produced. Since the lining is subjected to significant temperature fluctuations inside the motor vehicle, the notch also becomes visible on the outer side of the lining over time. However, the tearing characteristics are negatively influenced if the depth of the incision is reduced.

Methods in which the lining material is chemically dissolved or evaporated with the aid of a laser beam are not suitable for natural materials such as leather. The edges of the evaporated, dissolved or eroded regions harden and/or compress under climatic effects. The thusly produced hardened/compressed regions become clearly visible on the outer side of the lining over time.

With respect to the perforating method, in which the perforations subsequently need to be filled in again, it is disadvantageous that the perforations can only be produced in the unfinished state of the leather. In this case, it is inconvenient that the lining needs to be returned to the finishing shop after the perforations are produced therein.

SUMMARY OF THE INVENTION

Accordingly, it is an object of the present invention to provide a lining for the cover of an airbag, as well as a method for its manufacture, in which the weakening of the lining can be easily realized and simultaneously ensures consistent tearing characteristics, and in which the weakening remains invisible on the outer side of the leather, i.e., from the interior of the motor vehicle.

This objective is attained with an interior lining for the cover of a motor vehicle airbag that is manufactured of a lining material with successively arranged and spaced punctures arranged therein, wherein the punctures are produced on the inner side of the lining in the region that faces the periphery of the hinged airbag cover, wherein the successively arranged punctures form a weakening geometry that deviates from a straight line, and wherein the punctures in the lining material extend into the lining material by a predetermined depth and/or penetrate the lining material.

In contrast to conventional perforations, the punctures can penetrate the lining material without having to subsequently fill in the openings. The lining material, e.g., leather, can be completely finished before the punctures are produced therein. The lining can also be torn open more easily due to the oblong shape of the punctures. In contrast to embodiments, in which notches are scribed into the lining, the punctures do not gape on the suede side, but rather are almost completely closed again such that they do not stand out optically. The alignment of the weakening geometries that deviate from a straight line and are realized, e.g., in a sinuous or zigzag fashion results in tearing characteristics that permanently ensure a reliable response under the desired load.

The punctures preferably are spaced apart by identical distances in order to achieve uniform tearing characteristics along the entire periphery of the hinged airbag cover. A denser arrangement of punctures in a particularly preferred section may also positively influence the tearing characteristics in this section. The length of the punctures may lie, for example, between 0.1 mm and 1 mm.

According to one preferred embodiment of the lining, the punctures are arranged on at least one weakening geometry, preferably on several parallel weakening geometries. In this case, the punctures of adjacent weakening geometries are offset relative to one another. The lining can be torn even more reliably, in particular, due to the offset arrangement of several weakening geometries, as well as the alignment of the puncturing needle in the respective direction of the lines forming the weakening geometry (rotation of the puncturing needle).

The residual thickness of the lining material in the region of the punctures may approximately lie between one-half and one-twentieth of the lining material thickness depending on the number of weakening lines provided, the length of the punctures and other parameters of the lining material.

The lining material itself may have a thickness, for example, between the 0.4 mm and 1.5 mm.

The invention also pertains to a method for manufacturing an interior lining for the cover of a motor vehicle airbag, wherein said method is characterized in that successively arranged and spaced punctures are perpendicularly produced in the lining material from its inner side (suede side of the leather) in the non-laminated state, namely in the region that covers the periphery of the hinged airbag cover after the lining material is laminated on the hinged cover of the airbag, wherein said punctures extend into the lining material to a predetermined depth or penetrate the lining material.

The described method also makes it possible to weaken a composite consisting of two rigidly interconnected material layers, wherein one material layer consists of a decorative material used in motor vehicles (leather, imitation leather or the like) and the second material layer consists of a foam, a knitted spacer fabric or the like.

The punctures can be produced by means of a puncturing needle with an oblong point that is realized similar to a cutting edge. When producing the punctures along lines of an arbitrary geometry, the puncturing needle is always turned in such a way that it is aligned in the direction of the respective line of the geometry being produced, i.e., the needle follows the desired line direction as precisely as possible or is aligned parallel or essentially congruent to the line being produced.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1A:
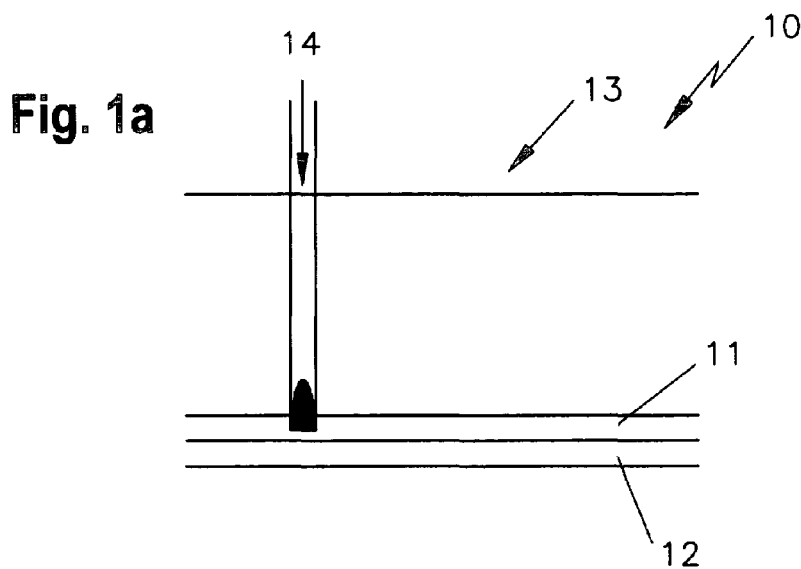
FIG. 1a, a cross section through a lining according to the invention that is weakened to a residual thickness by means of a puncturing needle.
Figure 1B:
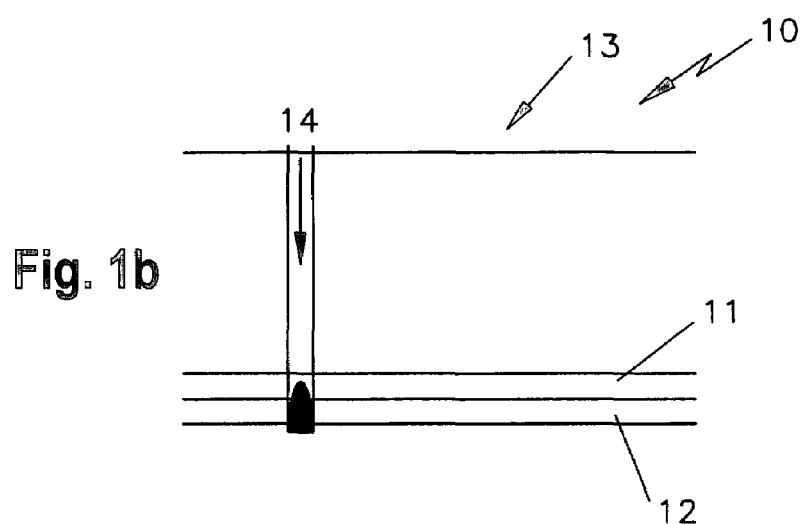
FIG. 1b, a cross section through a lining according to the invention that is penetrated by the puncturing needle.

FIGS. 1a and 1b show cross sections through a lining material 10 that consists of leather, the skin layer 11 of which is already finished and provided with a color layer 12. Punctures 15 are produced in this lining material from the inner side 13 (suede side of the leather) that is also referred to as the velour side with the aid of a puncturing needle 14. These punctures are produced by perpendicularly pressing the puncturing needle 14 into the inner side 13, wherein the punctures 15 in FIG. 1a only extend into the skin layer 11 to a certain depth while the punctures 15 in FIG. 1b completely penetrate the skin layer 11 and the color layer 12. In the embodiment shown in FIG. 1a, the residual thickness of the lining material approximately corresponds to one-twentieth of the total thickness D of the lining material 10.

Figure 2:
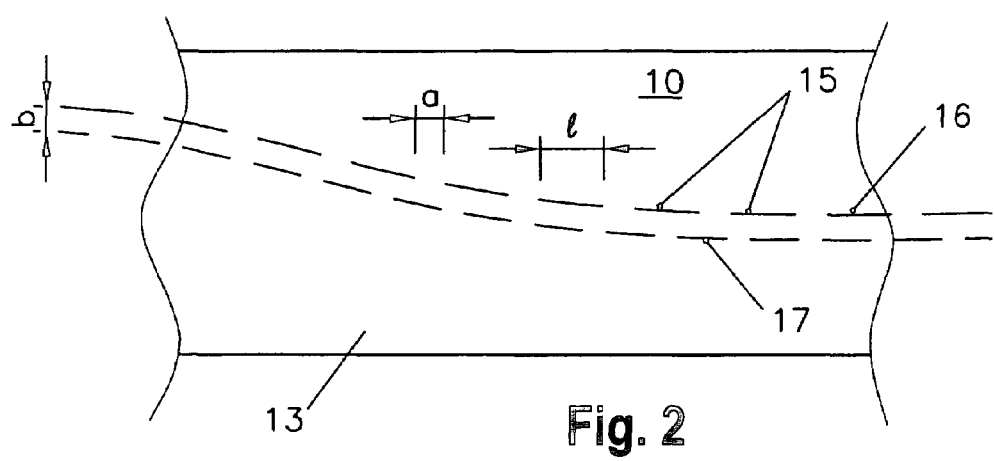
FIG. 2, a top view of the inner side of the lining sections shown in FIG. 1a and FIG. 1b, namely with punctures in the form of weakening geometries that deviate from a straight line.

One can ascertain from FIG. 2 that the punctures 15 produced with the aid of the puncturing needle 14 lie along one or more parallel weakening lines 16, 17 that deviate from straight lines, wherein the length of the punctures 15 approximately corresponds to the spacing a between two punctures. The spacing b between the two lines 16 and 17 approximately amounts to one-quarter of the length I of the punctures 15. However, it is possible to realize arbitrary variations in this respect. In the embodiment shown, the punctures 15 of the lines 16 and 17 are also offset relative to one another. This arrangement is advantageous in that it positively influences the tearing characteristics.

Figure 3:
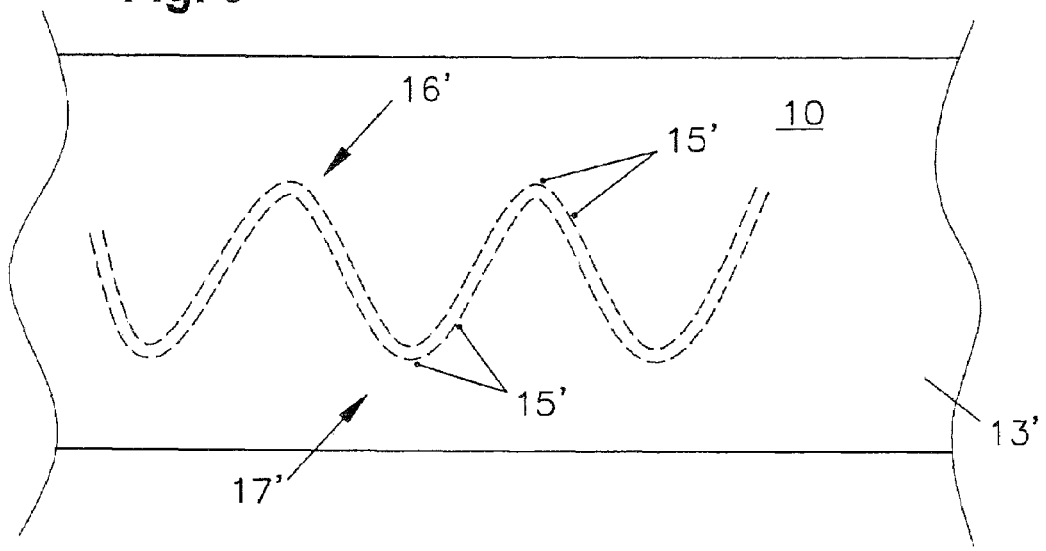
FIG. 3, a top view of the inner side of a lining section with a sinuous weakening geometry, and FIG. 4, a front view and a side view of a puncturing needle for producing punctures in the lining.

Analogous to FIG. 2, FIG. 3 shows a top view of a section of the lining material 10, particularly a decorative material used in motor vehicles, e.g., leather, imitation leather, fabric or the like. The weakening lines 16' and 17' are realized in a sinuous fashion, wherein the punctures 15' are placed such that the puncturing needle 14 producing the successive punctures 15' can be turned accordingly in order to produce one or more weakening lines 16' and 17' of the desired sinuous shape or any other shape. The desired perforations/weakening structures produced by means of the punctures 15' have uniform tearing characteristics under a load. The perforations/weakening structures are chosen such that they remain invisible even if the needle producing the punctures 15' completely penetrates the lining material 10.

The punctures produced in the lining material 10 in accordance with the invention are always produced in the lining material 10 from the inner side 13, 13' (suede side) in the non-laminated state thereof.

Figure 4:
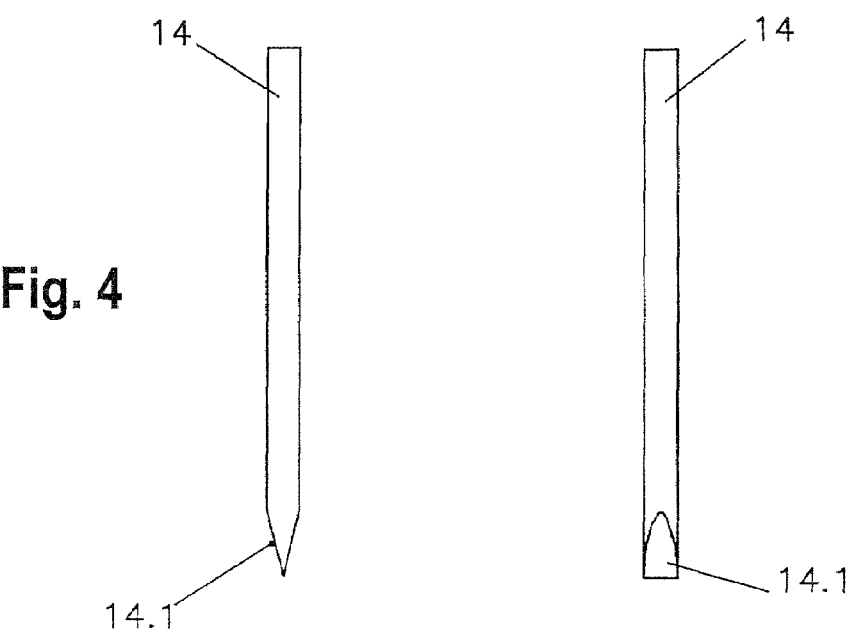

FIG. 4 shows a side view and a front view of the puncturing needle 14 for producing the punctures 15. The point of the puncturing needle 14 is tapered 14.1 similar to a cutting edge and produces the punctures 15, 15' in the lining material. In the embodiment shown, the puncturing needle 14 has a circular cross section. However, it may also be advantageous to utilize a puncturing needle with a square or rectangular cross section because such a puncturing needle can always be clamped in the corresponding tool in an oriented fashion. The puncturing needle used in accordance with the invention has a sharp cutting surface that is preferably ground.

It may also be advantageous to rigidly mount two identical puncturing needles such that they are spaced apart by a defined distance in order to simultaneously weaken the lining material along parallel weakening geometries (and to shorten the required fabrication time). In this case, the puncturing needles are preferably spaced apart by a distance between 0.5 and 1.0 mm and connected to one another in a defined fashion in this state.

In order to realize the required weakening geometries in a lining material for the hinged cover of an airbag, punctures 15 are produced on the inner side 13 of a lining material 10 by means of a puncturing needle 14, wherein the punctures 15 are intermittently produced in the lining material 10 from the inner side 13. The weakening geometry produced by means of the punctures 15 deviates from a straight line in order to ensure constant, reliable and defined tearing characteristics of the lining material 10. When producing the lines of arbitrary weakening geometries by means of the punctures, the puncturing needle is oriented relative to the desired line direction in one preferred embodiment of the invention, i.e., the cutting edge of the puncturing needle is aligned with the weakening geometry to be produced. In this context, the term aligned refers to the cutting edge of the puncturing needle being oriented along a desired line direction or parallel thereto.

The invention claimed is:

1. An interior lining for a cover of a motor vehicle airbag, comprising a lining material that contains successively arranged and spaced punctures in a region of its inner side adapted to face a periphery of a hinged airbag cover, said successively arranged punctures forming a weakening geometry that deviates from a straight line, wherein said punctures completely penetrate said lining material, wherein said lining material includes an outer side visible from an interior area of the motor vehicle.

2. An interior lining as defined in claim 1, wherein said lining material is composed of a decorative material used in motor vehicles.

3. An interior lining as defined in claim 2, wherein said decorative material is a material selected from the group consisting of leather, imitation leather, and fabric.

4. An interior lining as defined in claim 1, wherein said lining material is composed of a composite including two rigidly interconnected material layers.

5. An interior lining as defined in claim 4, wherein one of said material layers is composed of a decorative material used in motor vehicles and selected from the group consisting of leather and imitation leather, while another material layer is composed of a material selected from the group consisting of a foam, a knitted spacer of fabric, and a formed fabric.

6. An interior lining as defined in claim 1, wherein said punctures are elongated.

7. An interior lining as defined in claim 1, wherein said punctures are uniformly spaced apart.

8. An interior lining as defined in claim 1, wherein said punctures are arranged adjacent to one another in a denser arrangement in particularly preferred sections.

9. An interior lining as defined in claim 1, wherein said punctures have a length between 0.1 and 1 mm.

10. An interior lining as defined in claim 1, wherein said punctures have a spacing provided between them and lying on an order of a length of said punctures.

11. An interior lining as defined in claim 1, wherein said punctures are arranged on several weakening geometries that lie parallel to one another, so that the punctures of adjacent ones of said weakening geometries are offset relative to one another.

12. An interior lining as defined in claim 1, wherein said lining material has a thickness between 0.4 mm and 1.5 mm.

13. An interior lining as defined in claim 1, wherein said lining material is composed of two rigidly interconnecting material layers and has a thickness between 1 mm and 20 mm.

14. An interior lining as defined in claim 1, wherein said weakening geometry is provided in a form of a sinuous line.

15. An interior lining as defined in claim 1, wherein said punctures are arranged in two weakening geometries that are spaced apart by a defined distance.

16. An interior lining as defined in claim 15, wherein said two weakening geometries are spaced apart by the defined distance between 0.5 and 1.0 mm.

17. A method of manufacturing an interior lining for a cover of a motor vehicle airbag, comprising the steps of producing successively arrange and space punctures in a lining material from an inner side adapted to face a periphery of a hinged airbag cover, so that the successively arranged punctures form a weakening geometry that deviates from a straight line; and extending the punctures into the lining material, so that the punctures completely penetrate the lining material, wherein said lining material includes an outer side visible from an interior area of the motor vehicle.

18. A method as defined in claim 17, wherein said producing includes producing the punctures perpendicularly in the lining material in a non-laminated state and in a region that covers a periphery of a hinged airbag cover after the lining material is laminated on the airbag cover.

19. An interior lining as defined in claim 17, wherein said producing includes producing the punctures in a composite composed of two rigidly interconnecting material layers.

20. A method as defined in claim 19, wherein said producing includes producing the punctures in a composite consisting of two rigidly interconnected material layers, such that one of the layers is composed of a decorative material used in motor vehicles and selected from the group consisting of leather and imitation leather, while another material layer is composed of a material selected from the group consisting of a foam and a knitted spacer fabric.

21. A method as defined in claim 17, wherein said producing includes producing the punctures with a puncturing needle that has an oblong point similar to a cutting edge.

22. A method as defined in claim 21; and further comprising turning the puncturing needle and aligning the puncturing needle with a desired line direction when producing the weakening geometry that deviates from a straight line.

23. A method as defined in claim 21; and further comprising intermittently advancing the puncturing needle in a form of a defined upward-downward punching motion when producing the weakening geometry that deviates from a straight line.

24. A method as defined in claim 17, wherein said producing includes producing two parallel weakening geometries simultaneously in the lining material with two puncturing needles that are spaced apart by a defined distance.

25. A method as defined in claim 24; and further comprising selecting the defined distance between 0.5 and 1 mm.

* * * * *